Dec. 26, 1950     T. A. BUDNE     2,535,263
BUILDING JOINT CONNECTOR
Filed Feb. 3, 1948
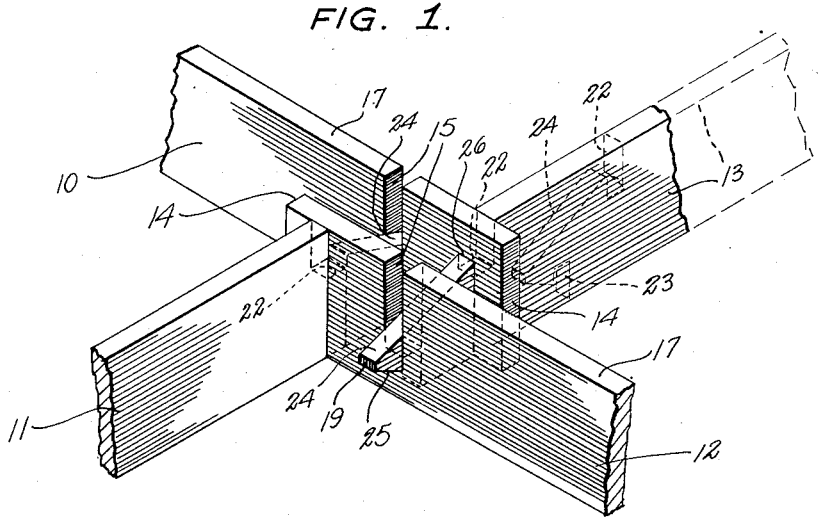
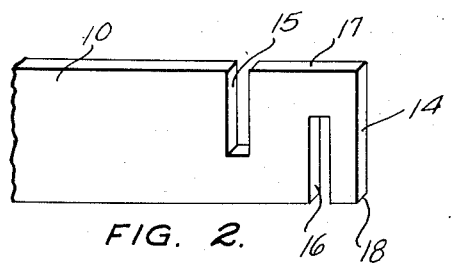
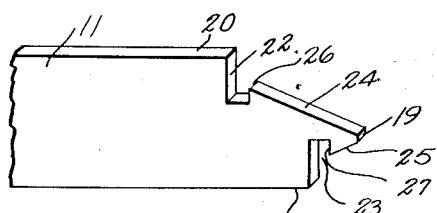
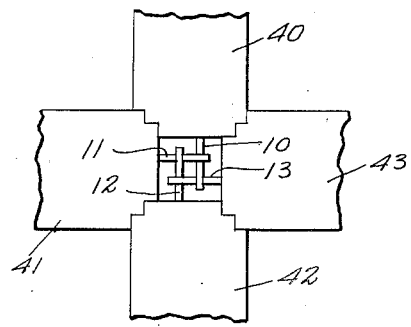
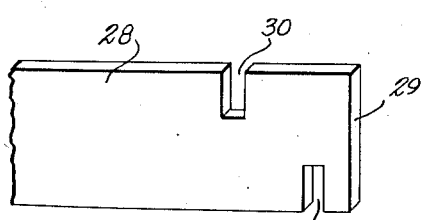
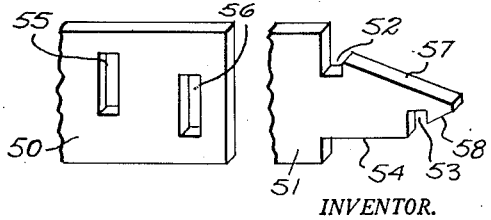
INVENTOR.
THOMAS A. BUDNE,
BY
McMorrow, Berman & Davidson
ATTORNEYS.

Patented Dec. 26, 1950

2,535,263

UNITED STATES PATENT OFFICE 2,535,263

BUILDING JOINT CONNECTOR

Thomas A. Budne, Brooklyn, N. Y.

Application February 3, 1948, Serial No. 6,085

10 Claims. (Cl. 189—36)

My invention relates to building joint connectors, and more particularly to such connectors as are adapted to connect structural elements together in angular relation and which are adapted to be connected by interlocking engagement of complementary parts without the use of nails, screws, bolts or the like.

With the foregoing in view, an object of my invention is to provide an improved building joint connector.

A further object is to provide an improved building joint connector wherein a plurality of connector arms are each provided with a pair of oppositely-directed and longitudinally-offset notches, the notches of each arm being adapted to interengage with oppositely-directed notches of two other arms disposed angularly relative to the first arm.

A further object is to provide an improved building joint connector wherein a plurality of connector arms are provided with a pair of oppositely-offset slots therein, and wherein a further plurality of connector arms are each provided with a pair of oppositely-directed longitudinally-offset notches therein, the notches of said last-named arms being adapted to interengage with oppositely-offset slots in the first-mentioned arms, disposed angularly relative to said notched arms.

Other objects and advantages reside in the particular structure of the several elements comprising the connectors, combination and arrangement of the several parts thereof, and with each other, all of which will be readily apparent to those skilled in the art upon reference to the attached drawings in connection with the following specification, wherein the invention is shown, described and claimed.

In the drawings:

Figure 1 is a perspective view of one form of joint formed by the connectors according to the invention, parts being broken away;

Figure 2 is a fragmentary perspective view of a connector forming one or more of the elements of the joint of Figure 1;

Figure 3 is a view like Figure 2 showing another form of connector comprising one or more of the elements of the joint of Figure 1;

Figure 4 is a view like Figures 2 and 3, but showing an alternative form of connector which may form one element of a joint like Figure 1;

Figure 5 is a fragmentary plan view on a reduced scale showing four structural elements connected together by the connector members in the manner disclosed in Figure 1.

Figure 6 is a view like Figure 2, but showing a modified form of connector arm;

Figure 7 is a view like Figure 3, but showing a further modified form of connector arm adapted for use with the connector arm of Figure 6.

Referring specifically to Figure 1 of the drawings, there is disclosed by way of an example one form of joint made by connector elements according to the invention. In the example shown, the joint is formed of four substantially identical connector arms 10, 11, 12 and 13. As shown, the connector elements comprise plates, and are preferably formed of steel or like flexible metal, and which are adapted to be connected to the ends of structural elements such as 40, 41, 42 and 43, Figure 5, in any suitable manner, not shown. Obviously, instead of plates, the connector elements could comprise bars or rods of other configuration than the rectangular plate-like structures shown.

The joint according to Figure 1 comprises a pair of connector plates 10 and 12 which are disposed in spaced parallel and partially overlapped relation. The elements 10 and 12, Figure 2, each comprise a free end 14 and a pair of oppositely-directed and longitudinally-offset notches 15 and 16, the notches 15 being upwardly directed and opening through the upper edge 17, while the notches 16 are downwardly directed and open through the lower edge 18. Both of the notches 15 are inwardly of the free end 14.

In the joint shown in Figure 1, the elements 11 and 13 are disposed in spaced parallel and partially overlapped relation and the structure of each is likewise identical, so the description of one will suffice. The element 11, Figure 3, comprises a free end 19 and a pair of oppositely-directed and longitudinally-offset notches 22 and 23 in inwardly-spaced relation to the free end 19. The notch 22 opens through the upper edge 20 of the element 11, while the notch 23 opens through the lower edge 21. The notches 22 and 23 are complementary in depth to the notches 15 and 16 of the elements 10 and 12, whereby when interconnected therewith the upper surfaces 17 and 20 of all elements will lie flush, as will the lower surfaces 18 and 21. While the notches 15 and 16 have been shown to have a greater depth than the notches 22 and 23, it is obvious that all notches could have a like depth or could be varied in many other ways to comprise a joint having flush upper and lower surfaces when completed. Forwardly of the notches 22 and 23, the upper and lower surfaces of the connector 11 are downwardly or inwardly inclined, to provide cam tracks 24 and 25, respectively. It is preferable, also, that the walls providing the forward sides of the notches 22 and 23 be axially inwardly disposed relative to the outer termini of the opposite or rear walls and merge with the points 26 and 27. The purpose of this structure will be apparent later.

The connector element shown in Figure 4 comprises a plate 28 having a free end 29 and a pair of oppositely-directed longitudinally-offset notches 30 and 31 in the upper and lower edges, respectively, thereof. The plate 28 is adapted to be substituted where necessary for one of the connector elements 11 or 13 in an instance where the notches 15 and 16 extend more than half-way through the elements 10 or 12, or where the interconnecting notches are of unequal length.

In forming the joint of Figure 1, and referring to Figure 5 in connection with Figure 1, the structural element 40 is placed in position and a second structural element 41 is placed at right angles thereto with the connector element 11 or 28 extending transversely of the connector element 10. The lower notch 23 or 31, as the case may be, is seated in the upwardly-directed notch 15 of the element 10. Thereafter, a third structural element 42 is disposed in alignment with the first element 40 so that the connector element 12 thereof extends across the connector element 11 or 28 of the structural element 41. The downwardly-directed notch 16 of the element 12 seats in the upwardly-directed notch 22 or 30 of the connector element 11 or 28. The fourth structural element 43 is now brought up in alignment with the structural element 41 with the connector element 13 in the broken line position, Figure 1. The structural element 43 is now moved toward the aligned element 41 so that the cam tracks 24 and 25 of the connector element 13 simultaneously engage the floors of the notches 15 and 16 of the connector elements 12 and 10, respectively. Thereafter, continued driving forwardly of the structural element 43 will snap the lowered points 26 and 27 over the floors of the notches 15 and 16, whereby to complete the joint and lock the same in place. This action is permitted, it is believed, by combination of factors. Thus, there is a small amount of play in the interengaged notches of the connector elements 10, 11 and 12, which permits slight tilting and slight vertical movement of such elements after their connection. Also, the elasticity of the metal of all of the connector elements permits a limited amount of temporary distortion of such elements as element 13 is driven home. Finally, the connector element 13 is upwardly tilted by the action of the cam tracks under the driving force applied to structural element 13 until the points 26 and 27 defining the inner ends of cam tracks 24 and 25 rest respectively upon the floors of notches 16 and 15 of elements 10 and 12. The structural element 43 is now elevated by a continuation of the driving force in a direction to eliminate the upward tilting of element 13. This results in a slight rotary movement of element 13 in a counter-clockwise direction, as viewed in Figure 1. The effect of such rotary movement is to cause points 26 and 27 to travel across the floors of notches 16 and 15 of elements 10 and 12 until the notches 22 and 23 of the element 13 interengage with such notches 16 and 15 whereby to complete the connection.

In the structure shown, the connector elements or arms 10, 11, 12 and 13 are of like diameter and of uniform width, whereby the slots 15, 16, 22 and 23 are likewise of a diameter corresponding to the thickness of the arms and are provided with straight parallel side walls.

In the form of invention shown by Figures 6 and 7, a pair of connector arms 50 are provided which correspond to the connector arms 10 and 12, except that the notches 15 and 16 have been replaced by slots 55 and 56 which are longitudinally spaced and vertically offset. In like manner, the connector arms 11 and 13 are replaced by a pair of connector arms 51 which are provided with upwardly and downwardly-directed slots 52 and 53 which are longitudinally spaced and which are adapted to seat in the slots 55 and 56 of connector arms 50. Below the slots 53 the lower edge of the connector arms 51 are recessed, as at 54, to permit entry into a slot 55 or 56. In this form of the invention, the pair of connector arms 50 are arranged in end-to-end, laterally-offset relation with the slot 55 of one arm lying in the same vertical plane as the slot 56 of the other arm and vice versa. Thereafter, a pair of connector arms 51 are connected by being forced through the aligned slots 55 and 56 of the adjacent connector arms 50. As in the first-described form of the invention, opposed cam surfaces 57 and 58 alternately cooperate with the floors of the slots 55 and 56 to effect the connection.

While the joints shown and described each comprise four connector arms or connector elements, it is obvious that a substantially similar joint could be provided with three such elements by extending the slots or notches obliquely relative to the side edges of the arms. In like manner, joints involving five or more connector arms can be readily formed. In such constructions, certain of the arms would be substantially identical and would correspond to the arms 10 or 50, while other arms would correspond to one of the arms 11 or 51.

Thus, while I have shown and described what are now thought to be the preferred embodiments of my invention, it is to be understood that the same is susceptible of other forms and expressions. Consequently, I do not limit myself to the precise structures shown and described hereinabove except as hereinafter claimed.

I claim:

1. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms comprising a separate and substantially identical plate and each of said second named two of said arms comprising a separate and substantially identical plate, each of said plates including a free end and top and bottom edges, each top edge being formed with an upwardly-directed notch in inwardly-spaced relation to said free end, each bottom edge being formed with a downwardly-directed notch in inwardly-spaced relation to said free end and in offset relation to said upwardly-directed notch, each of said notches having vertical side walls spaced apart a distance substantially equal to the thickness of one of said plates, and at least one of said plates including means for connecting said plates together with the notches of each plate engaging in oppositely-directed notches of each of two other plates disposed at right angles thereto.

2. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms comprising a separate and substantially identical plate and each of said second named two of said arms comprising a separate and substantially identical plate, each of said plates including a free end and top and bottom edges, each top edge being formed with an upwardly-directed notch in inwardly-spaced relation to said free end, each bottom edge being formed with a downwardly-directed notch in inwardly-spaced relation to said free end and in offset relation to said upwardly-directed notch, and at least one of said plates including means for connecting said plates together with the notches of each plate engaging in oppositely-directed notches of each of two other plates disposed at right angles thereto.

3. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms comprising a separate and substantially identical plate and each of said second named two of said arms comprising a separate and substantially identical plate, each of said plates including a free end and top and bottom edges, each top edge being formed with an upwardly-directed notch in inwardly-spaced relation to said free end, each bottom edge being formed with a downwardly-directed notch in inwardly-spaced relation to said free end and in offset relation to said upwardly-directed notch, and at least one of said plates being formed with inwardly-inclined upper and lower edges between said notches and said free end to provide upper and lower cam surfaces comprising means for connecting all of said plates together with the notches of each plate engaging in oppositely-directed notches of each of two other plates disposed at right angles thereto.

4. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms comprising a separate and substantially identical plate and each of said second named two of said arms comprising a separate and substantially identical plate, each of said plates including a free end and top and bottom edges, each top edge being formed with an upwardly-directed notch in inwardly-spaced relation to said free end, each bottom edge being formed with a downwardly-directed notch in inwardly-spaced relation to said free end and in offset relation to said upwardly-directed notch, each of said notches having vertical side walls spaced apart a distance substantially equal to the thickness of one of said plates, and at least one of said plates being formed with downwardly and upwardly-inclined upper and lower edges respectively between said notches and said free end providing upper and lower cam tracks leading to said notches, and said side walls of said notches adjacent said tracks being lower than the side walls remote therefrom.

5. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms comprising a separate and substantially identical plate and each of said second named two of said arms comprising a separate and substantially identical plate, each of said plates including a free end, and top and bottom edges, each top edge being formed with an upwardly-directed notch in inwardly-spaced relation to said free end, each bottom edge being formed with a downwardly-directed notch in inwardly-spaced relation to said free end and in offset relation to said upwardly-directed notch, and at least one of said plates being formed with downwardly and upwardly-inclined upper and lower edges respectively between said notches and said free end providing upper and lower cam tracks leading to said notches, and said side walls of said notches adjacent said tracks being lower than the side walls remote therefrom.

6. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms and of said second named two of said arms including a free end, each of said arms being formed with a pair of oppositely-directed and longitudinally-offset notches in inwardly-spaced relation to said free end, and said arms being connected together with the notches of each arm seated in opposed notches of two other arms lying at right angles thereto.

7. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms and of said second named two of said arms including a free end, each of said arms being formed with a pair of oppositely-directed and longitudinally-offset notches in inwardly-spaced relation to said free end, and said arms being connected together with the notches of each arm seated in opposed notches of two other arms lying at right angles thereto, and at least one of said arms being formed with opposed inwardly-inclined surfaces between its notches and said free end providing cam tracks leading to such notches.

8. A building joint connector, comprising four arms connected together with two of said arms disposed in spaced parallel and partially overlapped relation and connected to the other two of said arms disposed in spaced parallel and partially overlapped relation and at right angles to the first two of said arms, each of said first named two of said arms and of said second named two of said arms including a free end, each of said arms being formed with a pair of oppositely-directed and longitudinally-offset notches in inwardly-spaced relation to said free end, said arms being connected together with the notches of each arm seated in opposed notches of two other arms lying at right angles thereto, at least one of said arms being formed with opposed inwardly-inclined surfaces between its notches and said free end providing cam tracks leading to such notches, said notches of at least said last-named arm including opposed side walls, and one side wall of each of said last notches being adjacent one of said cam tracks and merging therewith radially inwardly of the outer terminus of the opposite side wall.

9. A building joint connector, comprising at least three arms connected together in angular relation to each other, each of said arms including a free end, each of said arms being formed with a pair of oppositely-directed and longitudinally-offset notches inwardly of said free end, and said arms being connected together with the notches of each arm seated in opposed notches of two other arms disposed angularly relative to the first arm.

10. A building joint connector, comprising at least three arms connected together in angular relation to each other, each of said arms including a free end, at least two of said arms being formed with a pair of oppositely-directed and longitudinally-offset notches inwardly of said free end, said third arm being formed with means seated in one notch of each of said other arms, whereby to connect said arms together, and one notch of each of said first two arms being seated in the remaining notch of the other of said first-named arms.

THOMAS A. BUDNE.

No references cited.